(12) United States Patent
Makimae et al.

(10) Patent No.: US 6,954,682 B2
(45) Date of Patent: Oct. 11, 2005

(54) METHOD AND APPARATUS FOR TIGHTENING BOLTS

(75) Inventors: Tatsumi Makimae, Fuchu-cho (JP); Yutaka Fujii, Fuchu-cho (JP); Hiroshi Shinagawa, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 123 days.

(21) Appl. No.: 10/635,450

(22) Filed: Aug. 7, 2003

(65) Prior Publication Data

US 2004/0027082 A1 Feb. 12, 2004

(30) Foreign Application Priority Data

Aug. 9, 2002 (JP) ........................................ 2002-234044

(51) Int. Cl.[7] ................................................. G01M 1/38
(52) U.S. Cl. ..................... 700/275; 73/862.23; 173/176; 81/467
(58) Field of Search ................................. 700/275, 159, 700/160; 73/862.23, 1.09, 862.08, 862.21; 173/176, 180–181; 81/467, 469

(56) References Cited

U.S. PATENT DOCUMENTS

| 5,172,616 A | * | 12/1992 | Negishi ........................ 81/67 |
| 5,396,703 A | * | 3/1995 | Rice ........................ 29/898.09 |
| 5,877,433 A | * | 3/1999 | Matsuzaki et al. ...... 73/862.381 |
| 6,105,475 A | * | 8/2000 | Ohmi et al. ................... 81/469 |
| 6,144,891 A | * | 11/2000 | Murakami et al. .......... 700/108 |
| 6,698,298 B2 | * | 3/2004 | Tsuji et al. .............. 73/862.21 |

FOREIGN PATENT DOCUMENTS

| JP | 02-041830 | 2/1990 |
| JP | 02-041830 A | 2/1990 |
| JP | 07-256566 | 10/1995 |

OTHER PUBLICATIONS

Japanese Office Action issued on Sep. 21, 2004 in the corresponding Japanese Patent Application No. 2002-234044.

* cited by examiner

Primary Examiner—Zolia Cabrera
(74) Attorney, Agent, or Firm—Nixon Peabody LLP; Donald R. Studebaker

(57) ABSTRACT

According to a bolt tightening method and a bolt tightening apparatus of the invention, a bolt is tightened by using a bolt tightening device, in which torque gradients expressed in terms of the ratio of a tightening torque exerted on the bolt to its turning angle are calculated by successively detecting the tightening torque at intervals of a specific bolt turning angle and calculating an average of individual torque gradient values by first and second torque gradient calculators, and the amount of tightening of the bolt is controlled by a tightening amount controller based on the average of the individual torque gradient values calculated.

5 Claims, 13 Drawing Sheets

| ANGLE | TORQUE |
|---|---|
| 10 | 0.32 |
| 11 | 0.44 |
| 12 | 0.6 |
| 13 | 0.79 |
| 14 | 1.03 |
| 15 | 1.31 |
| 16 | 1.64 |
| 17 | 2.03 |
| 18 | 2.47 |
| 19 | 2.99 |
| 20 | 3.58 |
| 21 | 4.24 |
| 22 | 4.99 |
| 23 | 5.84 |
| 24 | 6.77 |
| 25 | 7.81 |
| 26 | 8.98 |
| 27 | 10.2 |
| 28 | 11.6 |
| 29 | 13.1 |
| 30 | 14.8 |
| 31 | 16.6 |
| 32 | 18.5 |
| 33 | 20.6 |
| 34 | 22.9 |
| 35 | 25.4 |
| 36 | 28 |
| 37 | 30.8 |
| 38 | 33.8 |
| 39 | 37 |
| 40 | 40.5 |
| 41 | 44.1 |
| 42 | 48 |
| 43 | 52.1 |

METHOD AND APPARATUS FOR TIGHTENING BOLTS

BACKGROUND OF THE INVENTION

1. Field of the Invention

The present invention relates to a method and an apparatus for tightening bolts by using a bolt tightening device.

2. Description of the Related Art

A conventional method of installing a bearing cap for keeping a crankshaft of an engine to a mounting body, such as a cylinder body, is disclosed in Japanese Unexamined Patent Publication No. H2-41830, for example. This bearing cap installation method includes first to third tightening steps. In preparation for performing these steps, the bearing cap is first fastened to the mounting body by tightening bolts, and curved inside surfaces of the bearing cap and the mounting body are machined to produce a finished bearing bore having a correct round shape. Next, the bearing cap is once removed from the mounting body by undoing the bolts and bolted again to the mounting body with a pair of semicylindrical shell sections of a half-shell bearing together constituting a cylindrical bearing shell fitted in the bearing bore. It is to be noted that each half of the bearing shell has a crush height. In the first tightening step, a linear function representing a relationship between a bolt tightening torque and a tightening angle (bolt turning angle) needed in a process of breaking, or eliminating, bearing crush by fastening the halves of the bearing shell is obtained. In the second tightening step carried out in succession to the first tightening step, a linear function representing a relationship between a bolt tightening torque and a bolt turning angle needed in a process of tightening the bolts for fastening the halves of the bearing shell together with the bearing cap is obtained. In the third tightening step, the amount of additional bolt tightening is calculated by using the two linear functions obtained in the previously performed first and second tightening steps and the bearing cap is further fastened to the mounting body by applying the total amount of bolt tightening obtained by adding the amount of additional bolt tightening to the amount of initial tightening applied in the aforementioned process of machining the bearing bore. As the aforementioned first to third tightening steps are performed in an uninterrupted sequence, it is possible to ensure a high degree of roundness of the bearing bore while leaving a proper amount of clearance between the crankshaft and the half-shell bearing in this conventional method.

As stated above, the amount of additional bolt tightening is calculated by using a combination of the linear function representing the relationship between the bolt tightening torque and the bolt turning angle obtained in the first step of breaking the bearing crush of the halves of the bearing shell and the linear function representing the relationship between the bolt tightening torque and the bolt turning angle obtained in the second step of for fastening the halves of the bearing shell together with the bearing cap in the bearing cap installation method of the aforementioned prior art Publication. According to this bearing cap installation method, the two functions are obtained as precise linear functions. It is therefore possible to precisely determine coordinates of an inflection point X where a line of a first torque gradient a obtained in the first step and a line of a second torque gradient β obtained in the second step join if the first and second torque gradients α, β expressed in terms of the ratio of a bolt tightening torque T to a tightening angle (bolt turning angle) θ of the bolts are both linear as shown in FIG. 17. It is also possible in this conventional method to precisely determine a theoretical seating point θo which is theoretically expected to be reached at the beginning of tightening the bolts as well as the amount of additional tightening θm of the bolts corresponding to an axial force needed to be applied to the bolts for breaking the bearing crush based on the coordinates of the inflection point X and the second torque gradient β.

Therefore, it is possible to exert the same tightening force as exerted in the aforementioned process of machining the bearing bore by controlling the amount of bolt tightening based on the theoretical seating point θo and the amount of final tightening obtained by adding the aforementioned amount of additional tightening θm to the amount of initial tightening corresponding to the amount of tightening applied in the aforementioned process of machining the bearing bore. This makes it possible to set a proper amount of bearing clearance between the crankshaft and the half-shell bearing and to achieve a high degree of roundness of the bearing bore in which the half-shell bearing has been fitted.

However, the first and second torque gradients α, β measured at an actual assembly site where the bolts are tightened tend to be nonlinear. The torque gradient might gradually vary at about a point of transfer from a region of tightening of the first torque gradient α in an initial bolt tightening stage to a succeeding region of tightening of the second torque gradient β as shown in FIG. 6, for example. In such a case, if the second torque gradient β is determined between regions of tightening torques T3, T4 set at the proximity of an inflection point between the lines of the first torque gradient α and the second torque gradient β and a theoretical seating point θb which is theoretically expected to be reached at the beginning of tightening the bolts is calculated based on a line b having this gradient β, it is inevitable that a calculation error corresponding to changes in the torque gradient should occur between the calculated coordinate values of the theoretical seating point θb and the coordinate values of a true theoretical seating point θo'. Consequently, if bolt tightening operation is controlled based on the calculated value of the theoretical seating point θb, the bolt tightening force might be excessive or insufficient, and this would result in an inability to set a proper amount of bearing clearance.

Also, the half-shell bearing may have such a property that the first torque gradient α varies in a nonlinear fashion in the aforementioned process of breaking the bearing crush as shown in FIG. 7. In such a case, if the first torque gradient α is determined at a point where the bolt tightening torque T becomes equal to a specific value and coordinates of a joining point Xc between the first torque gradient α and the second torque gradient β are calculated based on a line c having the first torque gradient α and a line b having the second torque gradient β, it is inevitable that a calculation error corresponding to the aforementioned nonlinear property should occur between the calculated coordinate values of the joining point Xc and the coordinate values of a true joining point X'. Thus, there is such a problem that if the amount of additional tightening θc corresponding to the amount of bolt tightening required for breaking the bearing crush is calculated based on the coordinates of the joining point Xc, the calculated amount of additional tightening θc becomes excessive and an unnecessarily large tightening force would be exerted on the bolts.

SUMMARY OF THE INVENTION

In view of the foregoing, it is an object of the invention to provide a bolt tightening method and a bolt tightening apparatus which make it possible to tighten bolts in a precise fashion by setting the amount of bolt tightening to a proper value.

In one important aspect of the invention, there are provided a bolt tightening method and a bolt tightening apparatus for tightening a bolt by using a bolt tightening device, in which a torque gradient expressed in terms of the ratio of a tightening torque exerted on the bolt to its turning angle is calculated by successively detecting the tightening torque at intervals of a specific bolt turning angle and calculating an average of individual torque gradient values, and the amount of tightening of the bolt is controlled based on the average of the individual torque gradient values calculated.

According to this aspect of the invention, it is possible to properly control the amount of bolt tightening even when the torque gradient varies in a nonlinear fashion with changes in the bolt turning angle.

These and other objects, features and advantages of the invention will become more apparent upon reading the following detailed description along with the accompanying drawings.

DETAILED DESCRIPTION OF THE PREFERRED EMBODIMENTS OF THE INVENTION

First Embodiment

Figure 1:
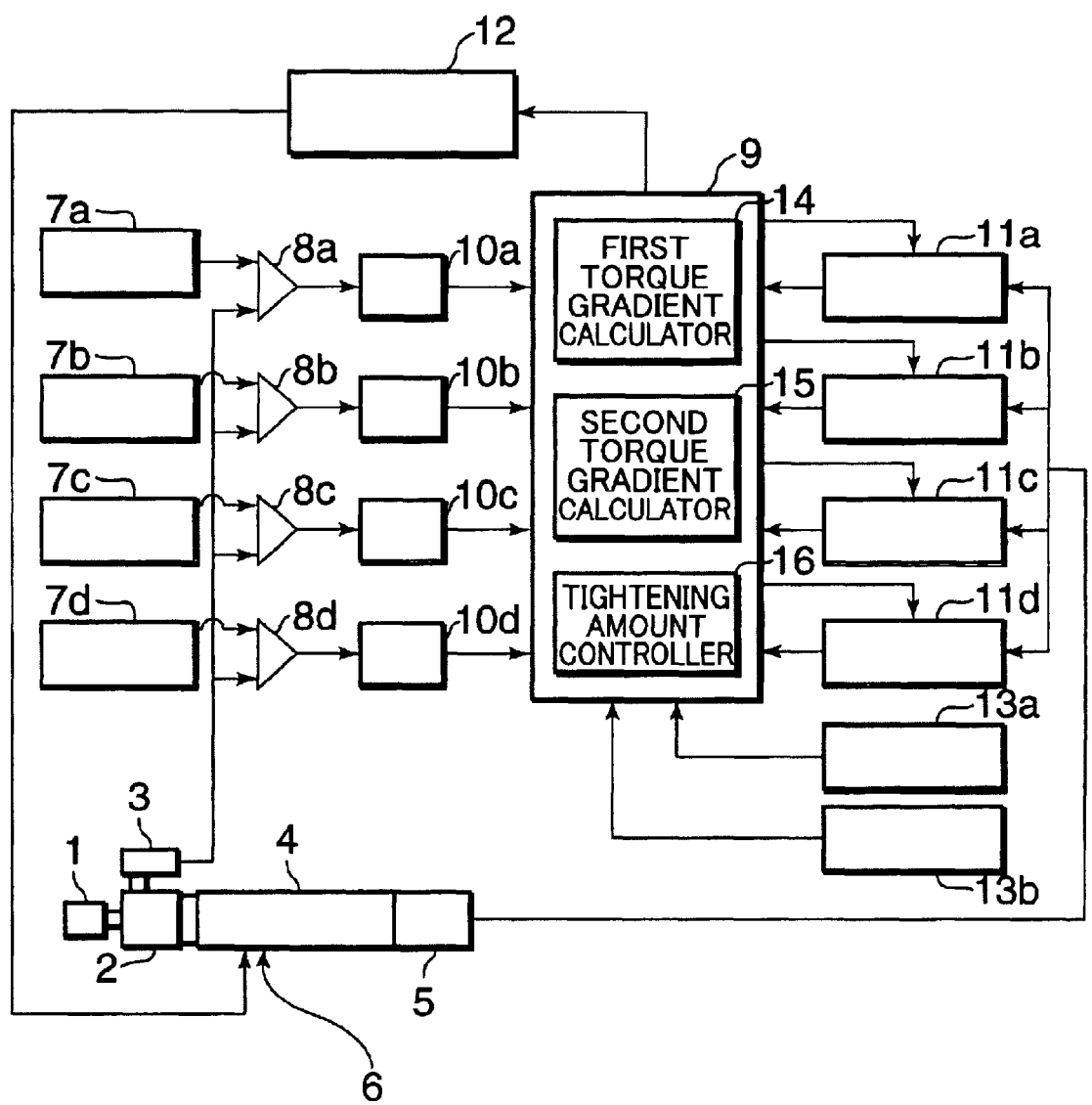
FIG. 1 is a block diagram of a bolt tightening apparatus according to a first embodiment of the invention.

FIG. 1 is a block diagram of a bolt tightening apparatus according to a first embodiment of the invention. The bolt tightening apparatus includes a socket 1 to be fitted over the head of a bolt, a torque transducer 2 for regulating a tightening torque applied to the bolt by the socket 1, a tightening torque sensor 3 for detecting the tightening torque applied to the bolt as it is tightened with the socket 1, a drive motor 4 for turning the socket 1 and a bolt tightening device 6 including a nut runner associated with an angle encoder 5 for measuring a bolt turning angle by detecting the angle of rotation of the drive motor 4.

The bolt tightening apparatus further includes first to fourth tightening torque setters 7a–7d for setting first to fourth tightening torques within the elastic region of the bolt, first to fourth comparators 8a–8d for comparing the bolt tightening torque detected by the tightening torque sensor 3 with the first to fourth tightening torque values set by the first to fourth tightening torque setters 7a–7d and outputting match signals for the individual tightening torques, first to fourth analog gates 10a–10d for outputting control signals corresponding to the match signals output from the individual comparators 8a–8d to a central processing unit (CPU) 9, first to fourth angle gates 11a–11d for feeding control signals to the CPU 9 for causing the angle encoder 5 to measure the bolt turning angle at points in time when the aforementioned control signals are output from the first to fourth analog gates 10a–10d, a servo amplifier 12 for controlling the drive motor 4 according to a control signal fed from the CPU 9, and first and second calculation angle setters 13a, 13b for setting angular steps of calculation and calculation angle ranges when calculating first and second torque gradients which will be discussed later.

The CPU 9 includes a first torque gradient calculator 14 for calculating the first torque gradient between points of the first and second tightening torque values set by the first and second tightening torque setters 7a, 7b, a second torque gradient calculator 15 for calculating the second torque gradient between points of the third and fourth tightening torque values set by the third and fourth tightening torque setters 7c, 7d, and a tightening amount controller 16 which determines coordinates of a theoretical seating point θo which is theoretically expected to be reached at the beginning of tightening each bolt based on the calculated value of the second torque gradient, determines coordinates of an inflection point X where the lines of the first and second torque gradients join based on the calculated values of the two torque gradients, determines the amount of additional bolt tightening based on the coordinates of the inflection point and the second torque gradient, and then controls the amount of bolt tightening based on the amount of initial tightening set by regarding the theoretical seating point as a starting point of tightening and the aforementioned amount of additional bolt tightening.

Figure 2:
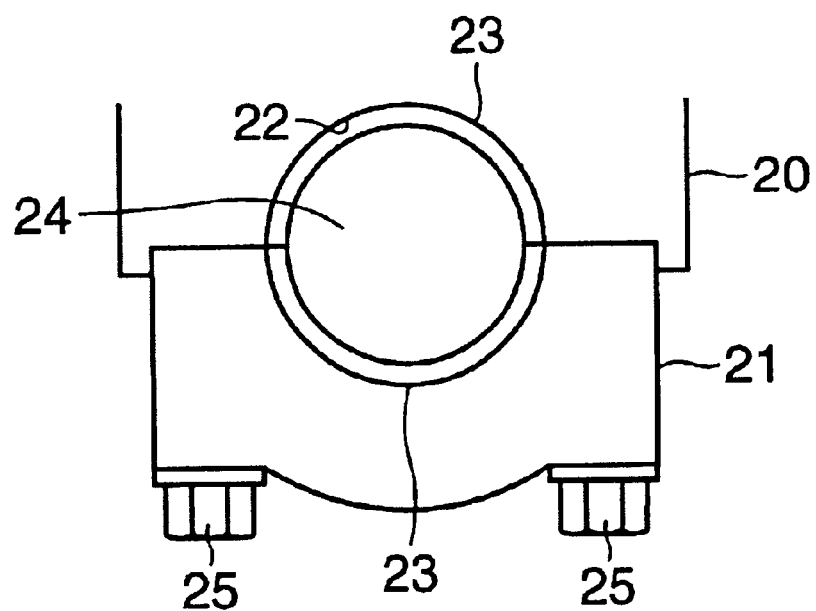
FIG. 2 is a diagram showing how shell sections of a half-shell bearing are mounted in place by a bearing cap.

The first torque gradient calculator 14 calculates a torque gradient which is the ratio of the bolt tightening torque to the bolt turning angle occurring in an initial bolt tightening stage. As an example, a pair of semicylindrical half shell sections 23 of a half-shell bearing and a crankshaft 24 are fitted in a bearing bore 22 which is formed between a bearing cap 21 and a mounting body 20, such as a cylinder body of an engine, and the bearing cap 21 is fastened to the mounting body 20 by tightening bolts 25 as shown in FIG. 2. The first torque gradient calculator 14 determines the first torque gradient when bearing crush of each half of the half-shell bearing 23 is collapsed by tightening the bolts 25.

Figure 3:
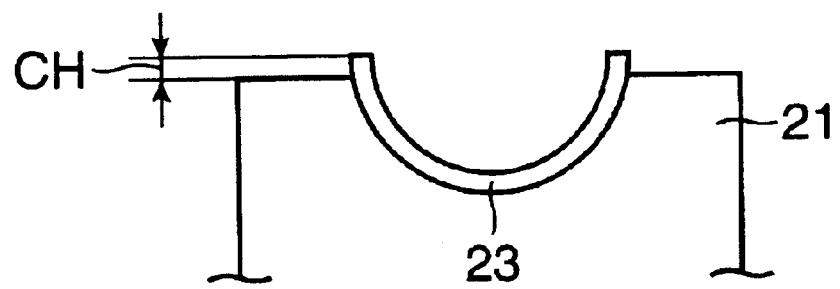
FIG. 3 is a diagram showing how one half of the half-shell bearing sits in the bearing cap before tightening.

The length of an outer arc-shaped boundary of the cross section of each half shell section 23 is made slightly larger than half the circumference of the cross section of the bearing bore 22 as shown in FIG. 3, so that the two halves of the half-shell bearing 23 extend beyond halves of the bearing bore 22 by a specific crush height CH. Therefore, a tightening force exerted in the initial bolt tightening stage is used up for eliminating the crush height CH by breaking the bearing crush. The aforementioned first torque gradient is determined as the first and second tightening torque values are set to values corresponding to specific bolt tightening torques needed when collapsing the bearing crush and the first torque gradient calculator 14 calculates the ratio of the tightening torque applied to each bolt 25 to its turning angle between the points of the first and second tightening torque values.

Also, the aforementioned second torque gradient is determined as the third and fourth tightening torque values are set to values corresponding to specific bolt tightening torques needed when fastening the two halves of the half-shell bearing 23 together with the bearing cap 21 by tightening each bolt 25 after collapsing the crush of the half-shell bearing 23 and the second torque gradient calculator 15 calculates the ratio of the tightening torque applied to each bolt 25 to its turning angle between the points of the third and fourth tightening torque values are set to values.

Figure 4:
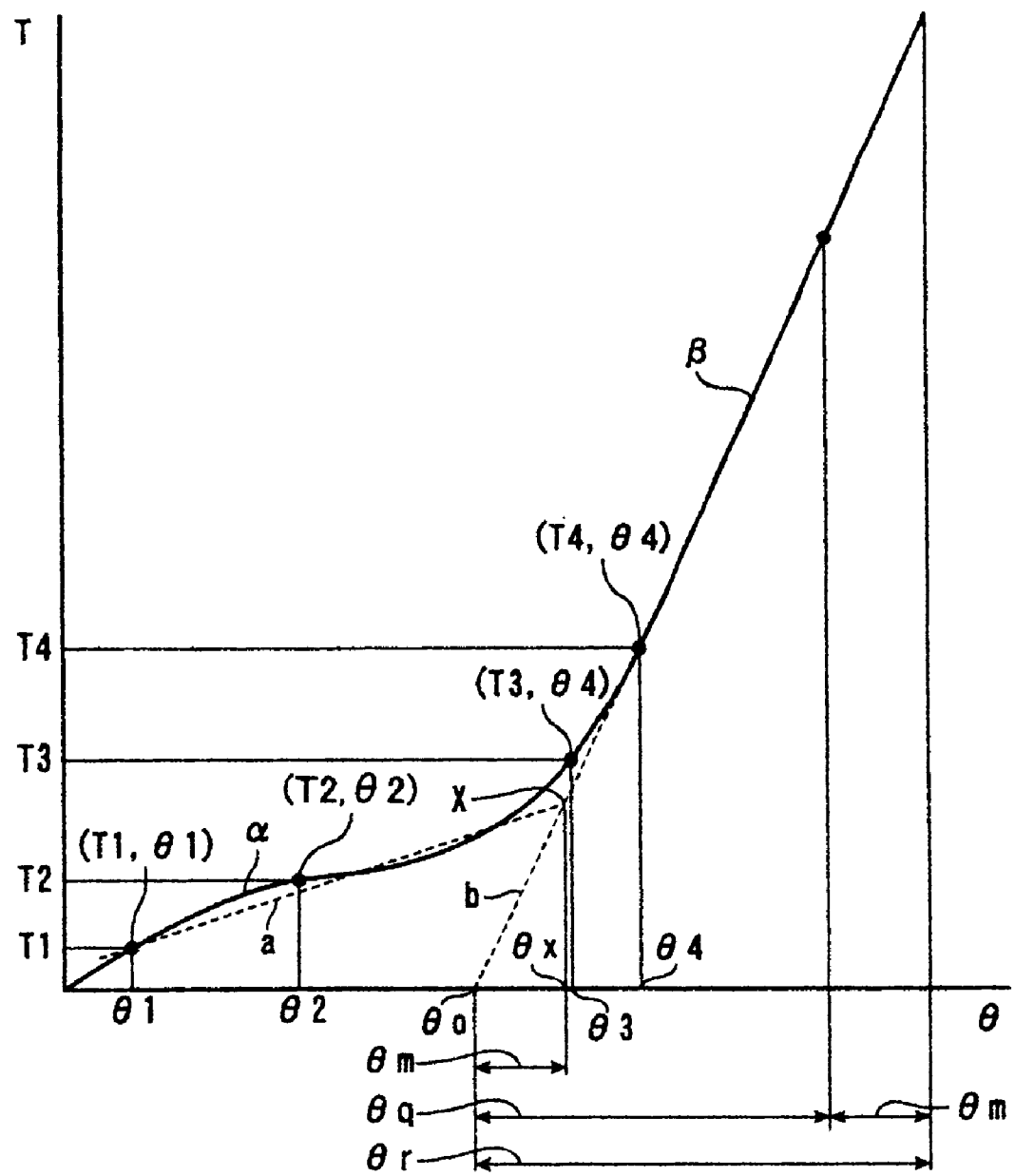
FIG. 4 is a graph showing the relationship between bolt turning angle and tightening torque.

Operation of the first torque gradient calculator 14 is further explained with reference to a graph of FIG. 4 in which the x-axis represents the turning angle θ of each bolt 25 and y-axis represents its tightening torque T. The first torque gradient calculator 14 includes a mean torque gradient calculator which calculates the torque gradient, or the ratio of the bolt tightening torque successively detected by the tightening torque sensor 3 to the bolt turning angle at intervals of a particular calculation angle (e.g., 1°) set by the first calculation angle setters 13a from a point in time when the tightening torque T exerted on each bolt 25 reaches the first tightening torque value T1 to a point in time when the tightening torque T exerted on each bolt 25 reaches the second tightening torque value T2 and, then, determines the first torque gradient α as a mean value of the torque gradients obtained between the point of the first tightening torque value T1 and the point of the second tightening torque value T2 by an integral average gradient method in which the values of individual torque gradients are averaged by equation (1) below:

$$\alpha = (\Sigma Ti/\theta i)/(n \pm X) \quad (1)$$

where Ti is the tightening torque applied to the bolt 25, θi is the range of the bolt turning angle preset to about 2°, n is the number of torque gradient calculations and X is a tightening torque estimation constant.

If the first torque gradient α has a tendency to increase, the estimation constant X is set to −1 whereas, if the first torque gradient α has a tendency to decrease, the estimation constant X is set to 1. If the first torque gradient α does not vary at all or alternately increases and decreases, the estimation constant X is set to 0.

The second torque gradient calculator 15 includes a mean torque gradient calculator which calculates the torque gradient, or the ratio of the bolt tightening torque successively detected by the tightening torque sensor 3 to the bolt turning angle at intervals of a particular calculation angle (e.g., 1°) set by the second calculation angle setters 13b from a point in time when the tightening torque T exerted on the bolt 25 reaches the third tightening torque value T3 to a point in time when the tightening torque T exerted on the bolt 25 reaches the fourth tightening torque value T4 and, then, determines the second torque gradient β as a mean value of the torque gradients obtained between the point of the third tightening torque value T3 and the point of the fourth tightening torque value T4 by the same method as used in determining the first torque gradient α in which the values of individual torque gradients are averaged.

The tightening amount controller 16 determines the theoretical seating point θo which is theoretically expected to be reached at the beginning of bolt tightening using a function T=β·θ−θo including the second torque gradient β as a coefficient, determines the inflection point X where the lines of the first and second torque gradients α, β join using a function T=α·θ−θo including the first torque gradient α as a coefficient and the aforementioned function including the second torque gradient β as a coefficient, and determines the amount of additional tightening θm of the bolt 25 using a function including coordinates of the inflection point X and the second torque gradient β as a coefficient. Then, the tightening amount controller 16 controls the amount of tightening of the bolt 25 based on the amount of initial tightening θq set by regarding the theoretical seating point θo as a starting point of tightening and the amount of additional tightening θm.

Referring again to FIG. 4, a line b which passes coordinates (T4, θ4) reached when the tightening torque T exerted on the bolt 25 matches the fourth set value T4 and has a gradient corresponding to the second torque gradient β calculated by the second torque gradient calculator 15 intersects the x-axis at a point of the turning angle θo. This point of intersection is set as the theoretical seating point θo. Also, a line a shown in FIG. 4 passes which passes coordinates (T1, θ1) reached when the tightening torque T exerted on the bolt 25 matches the first set value T1 and has a gradient corresponding to the first torque gradient α. The point of intersection of this line a and the line b corresponds to the aforementioned inflection point X where the first torque gradient α (line a) and the second torque gradient β (line b) join. A crush component angle obtained by subtracting a bolt turning angle θx from the aforementioned theoretical seating point θo is set as the amount of additional tightening θm. Then, the amount of tightening (bolt turning angle) applied to the individual bolts 25 when machining the bearing bore 22 is set as the aforementioned amount of initial tightening θq, and a value obtained by adding the amount of additional tightening (crush component angle) θm to the amount of initial tightening (bolt turning angle) θq is set as the amount of final tightening θr. The amount of tightening (bolt turning angle) is then measured regarding the theoretical seating point θo as a starting point of tightening. Tightening of the bolts 25 is stopped at a point where the measured value of this amount of tightening (bolt turning angle) matches the amount of final tightening θr.

Figure 5:
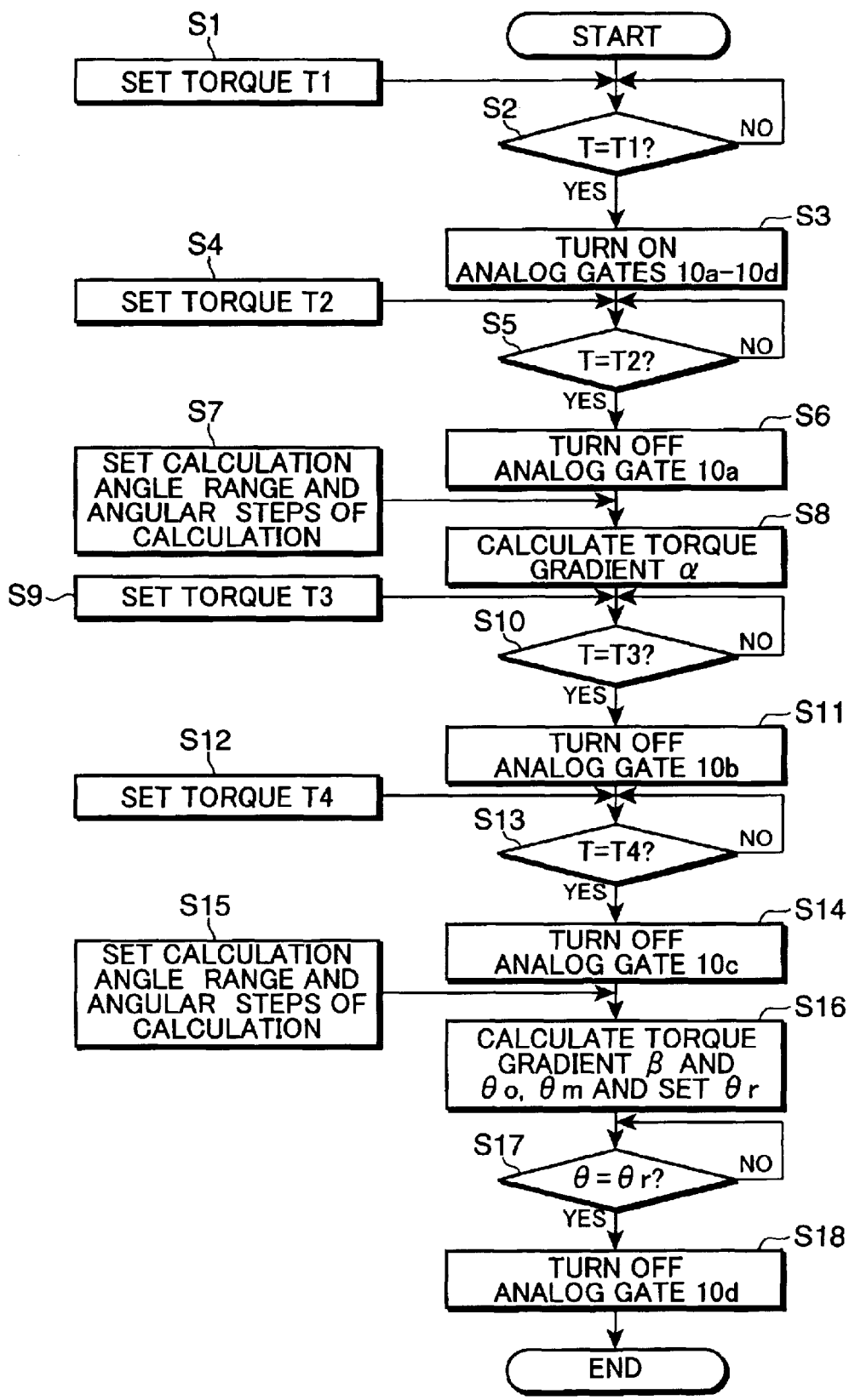
FIG. 5 is a flowchart showing how a bolt tightening method of is carried out by the bolt tightening apparatus of the first embodiment.

Described below referring to a flowchart of FIG. 5 is a sequence of a bolt tightening method carried out by the bolt tightening apparatus of the present embodiment when installing the bearing cap 21 to the mounting body 20 by fastening the bolts 25 with the half-shell bearing 23 fitted in the bearing bore 22. A process of tightening each bolt 25 commences as the drive motor 4 is caused to turn by a nut runner start signal fed from an external source to the servo amplifier 12. When the process begins, the first tightening torque setter 7a sets the first tightening torque value T1 (step S1). Next, the first comparator 8a compares the tightening torque T applied to the bolt 25 detected by the tightening torque sensor 3 with the first set value T1 and judges whether they coincide with each other (step S2).

At a point where the detected tightening torque T is judged to have matched the first set value T1 (Yes in S2), the first to fourth analog gates 10a–10d are set to an ON state (step S3). Then, coordinates (T1, θ1) reached at this point in time are determined and the second tightening torque setter 7b sets the second tightening torque value T2 (step S4). Next, the second comparator 8b compares the tightening torque T applied to the bolt 25 detected by the tightening torque sensor 3 with the second set value T2 and judges whether they coincide with each other (step S5).

At a point where the detected tightening torque T is judged to have matched the second set value T2 (Yes in S5), the first analog gate 10a is set to an OFF state (step S6). Then, coordinates (T2, θ2) reached at this point in time are determined, the first calculation angle setters 13a sets a calculation angle range and angular steps of calculation (step S7), and the first torque gradient calculator 14 calculates the first torque gradient α by the aforementioned integral average gradient method based on the set calculation angle range and angular steps of calculation as well as the coordinates (T1, θ1) and (T2, θ2) (step S8).

Subsequently, the third tightening torque setter 7c sets the third tightening torque value T3 (step S9), and the third comparator 8c compares the tightening torque T applied to the bolt 25 detected by the tightening torque sensor 3 with the third set value T3 and judges whether they coincide with each other (step S10).

At a point where the detected tightening torque T is judged to have matched the third set value T3 (Yes in S10), the second analog gate 10b is set to an OFF state (step S11). Then, after coordinates (T3, θ3) reached at this point in time have been determined, the fourth tightening torque setter 7d sets the fourth tightening torque value T4 (step S12), and the fourth comparator 8d compares the tightening torque T applied to the bolt 25 detected by the tightening torque sensor 3 with the fourth tightening torque value T4 and judges whether they coincide with each other (step S13).

At a point where the detected tightening torque T is judged to have matched the fourth set value T4 (Yes in S13), the third analog gate 10c is set to an OFF state (step S14). Then, after coordinates (T4, θ4) reached at this point in time have been determined, the second calculation angle setters 13b sets a calculation angle range and angular steps of calculation (step S15). Subsequently, the second torque gradient calculator 15 calculates the second torque gradient β by the aforementioned integral average gradient method based on the set calculation angle range and angular steps of calculation as well as the coordinates (T3, θ3) and (T4, θ4), the tightening amount controller 16 determines the theoretical seating point θo and the crush component angle θm using the aforementioned functions including the first and second torque gradients α, β as coefficients, and the amount of final tightening θr of the bolt 25 is set (S16).

Now, a judgment is made to determine whether the turning angle θ has reached a value corresponding to the amount of final tightening θr of the bolt 25 (step S17). When the turning angle θ is judged to have reached the value corresponding to the amount of final tightening θr (Yes in S17), the fourth analog gate 10d is set to an OFF state (step S18) and the aforementioned operation for controlling the tightening of the bolt 25 is finished.

In the aforementioned method of tightening the bolt 25 by using the bolt tightening device 6, the first and second torque gradients α, β expressed in terms of the ratio of the bolt tightening torque T to the bolt turning angle θ are calculated by detecting the tightening torque T at intervals of a specific turning angle of the bolt 25, calculated values of the first and second torque gradients α, β are averaged, and the amount of tightening (bolt turning angle) is controlled based on averages of the first and second torque gradients α, β. This approach makes it possible to properly control the turning angle of the individual bolts 25 even when the torque gradients α, β are nonlinear.

More specifically, the second torque gradient β, which is the ratio of the bolt tightening torque T to the bolt turning angle θ determined when the half-shell bearing 23 is seated against the mounting body 20 by fastening the bearing cap 21 with the bolts 25, is calculated by the integral average gradient method using the aforementioned equation (1) after the crush height CH is eliminated by tightening the bolts 25 with the two halves of the half-shell bearing 23 having the crush fitted in the bearing bore 22 formed between the bearing cap 21 and the mounting body 20 by machining their curved inside surfaces. This makes it possible to properly determine the second torque gradient β between points in time when the bolt tightening torque T matches the third set value T3 and the fourth set value T4 set at the proximity of an inflection point between the first torque gradient α and the second torque gradient β and to calculate the coordinates of the theoretical seating point based on the line b having the second torque gradient β even when the torque gradient gradually varies near the inflection point between the first torque gradient α and the second torque gradient β.

Figure 6:
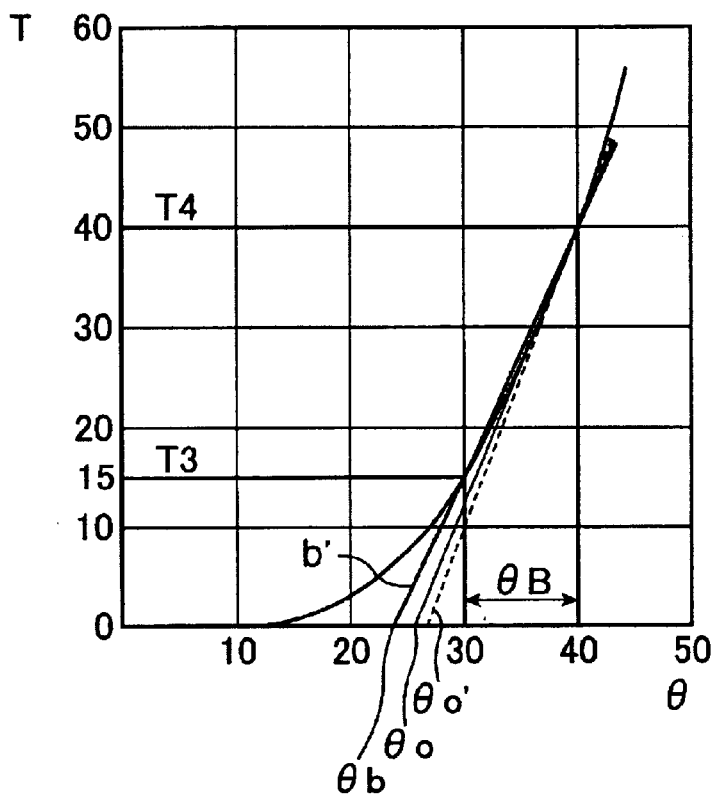
FIG. 6 is a graph showing the relationship between bolt turning angle and tightening torque associated with a table showing their calculated values.

An experiment was conducted to calculate the second torque gradient β between points in time when the bolt tightening torque T matched the third and fourth set values T3, T4 during a process of seating the half-shell bearing 23 by fastening the bearing cap 21 in a case where the tightening torque gradually varied from an initial bolt tightening stage as shown in FIG. 6, for example. In this experiment, the bolt turning angle to a theoretical seating point θb was 24°, causing a 4° deviation from a theoretical seating point θo' which was expected to be true, according to the conventional method in which the theoretical seating point θb was determined based on the point of intersection of a line b' passing points of coordinates corresponding to the third and fourth set values T3, T4 and the x-axis. In contrast, it was verified that the bolt turning angle to the theoretical seating point θo was 26°, causing a smaller deviation from the expectedly true theoretical seating point θo' when the second torque gradient β was calculated by the aforementioned integral average gradient method.

Figure 7:
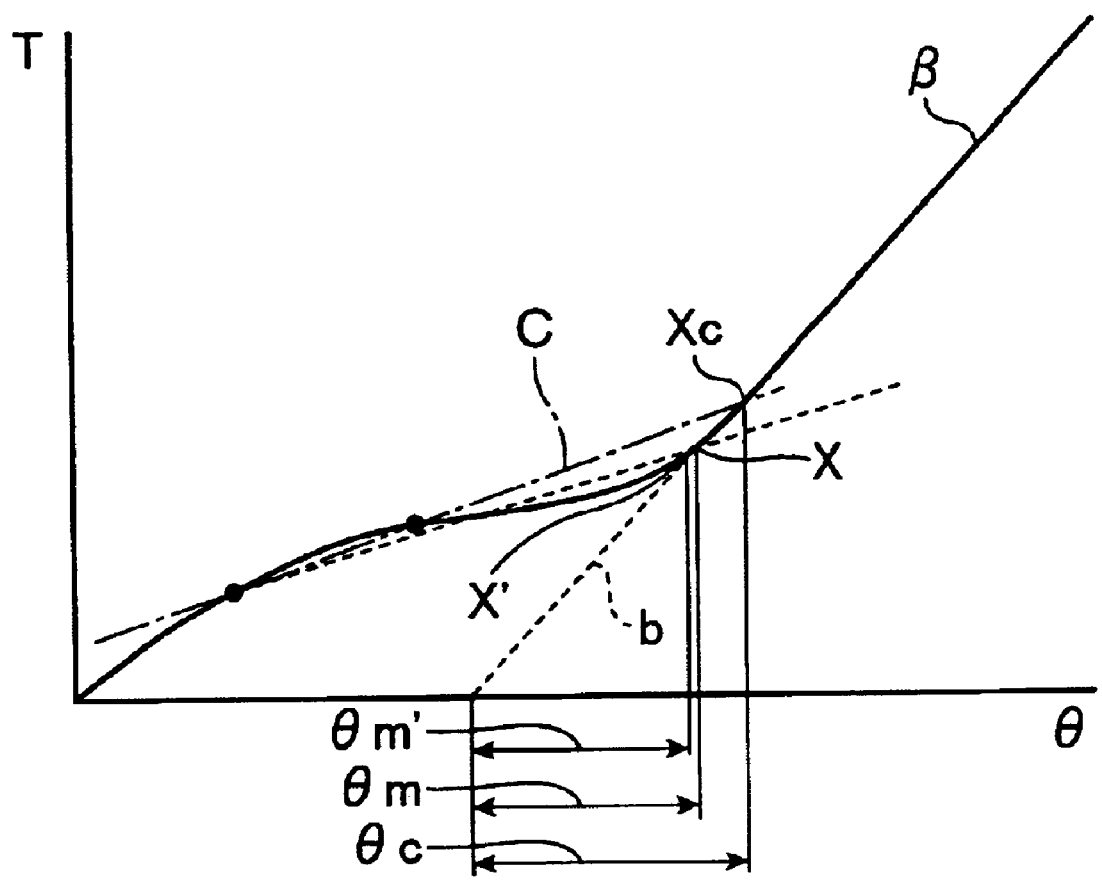
FIG. 7 is a graph showing how an inflection point between first and second torque gradients and the amount of additional bolt tightening are determined according to the first embodiment.

Also, an experiment was conducted to determine the inflection point X joining the first and second torque gradients α, β by calculating the first torque gradient α between a point where the bolt tightening torque T became equal to the first set value T1 and a point where the bolt tightening torque T became equal to the second set value T2 during the process of eliminating the crush height CH by breaking the crush of the half-shell bearing 23 in a case where the tightening torque varied in a nonlinear fashion from the initial bolt tightening stage as shown in FIG. 7. This experiment revealed that, according to the conventional method in which an inflection point Xc between lines of the first and second torque gradients α, β was determined based on a line c passing points of coordinates corresponding to the first and second set values T1, T2, the inflection point Xc greatly deviated from an expectedly true point of intersection X' of the two lines of the first and second torque gradients α, β. In contrast, it was verified that when the point of intersection X of the two lines of the first and second torque gradients α, β was determined based on the first torque gradient α calculated by the integral average gradient method, it was possible to reduce the deviation of the point of intersection X from the expectedly true point of intersection X'.

It is understood from the foregoing discussion that after determining the first torque gradient α, which is the ratio of the bolt tightening torque T to the bolt turning angle θ calculated in a stage of together tightening the bearing cap 21 and the half-shell bearing 23, by averaging values of the first torque gradient α, and determining the inflection point X joining the first and second torque gradients α, β based on calculated values of the first and second torque gradients α, β, the amount of additional tightening θm can be calculated based on the coordinates of the inflection point X and the line b having the second torque gradient β.

With this arrangement, the bearing cap 21 can be installed in such a manner that the half-shell bearing 23 is seated tightly and correctly in the bearing bore 22 by properly performing the aforementioned operation for controlling the tightening of the bolt 25 starting from the theoretical seating point θo regardless of whether the crush height CH is large or small. It is therefore possible to effectively prevent such a problem that the bolt 25 is tightened with an unnecessarily large force due to an excessively large amount of additional tightening θm exerted on the bolt 25 or the tightening force is insufficient due to too small an amount of additional tightening θm. An advantage of the aforementioned arrangement of the invention is that it makes it possible to create a proper amount of bearing clearance between the half-shell bearing 23 and the crankshaft 24 and achieve a high degree of roundness of the bearing bore 22 in which the half-shell bearing 23 has been fitted.

While the foregoing discussion of the present embodiment has dealt with an example in which both the first torque gradient α obtained in a stage of eliminating crush height CH by tightening the bolts 25 and the second torque gradient β obtained in a succeeding stage of fastening the half-shell bearing 23 with the bearing cap 21 by further tightening the bolts 25 are calculated by averaging values of the individual torque gradients α, β, only one of these torque gradients α, β may be calculated by the integral average gradient method using the aforementioned equation (1).

Referring again to FIG. 4, the amount of additional tightening θm of the bolt 25 is calculated at first based on the coordinates of the inflection point X joining the first and second torque gradients α, β and the line b having the second torque gradient β and, then, the amount of tightening (turning angle) of the bolt 25 is controlled based on the amount of initial tightening θq set by regarding the theoretical seating point θo as a starting point of tightening and the amount of additional tightening θm in this embodiment. This control method may be so arranged to perform a step of comparing a calculated value of the amount of additional tightening θm with minimum and maximum values, which are preset to specific values, followed by a step in which if the calculated value of the amount of additional tightening θm is smaller than the preset minimum value (e.g., 30°), this minimum value is set as the amount of additional tightening θm, and if the calculated value of the amount of additional tightening θm is larger than the preset maximum value (e.g., 60°), this maximum value is set as the amount of additional tightening θm. It is possible with this simple arrangement to effectively prevent such a problem that the tightening force is insufficient due to too small an amount of additional tightening θm or the bolt 25 is tightened with too large a force due to an excessively large amount of additional tightening θm exerted on the bolt 25.

Second Embodiment

Figure 8:
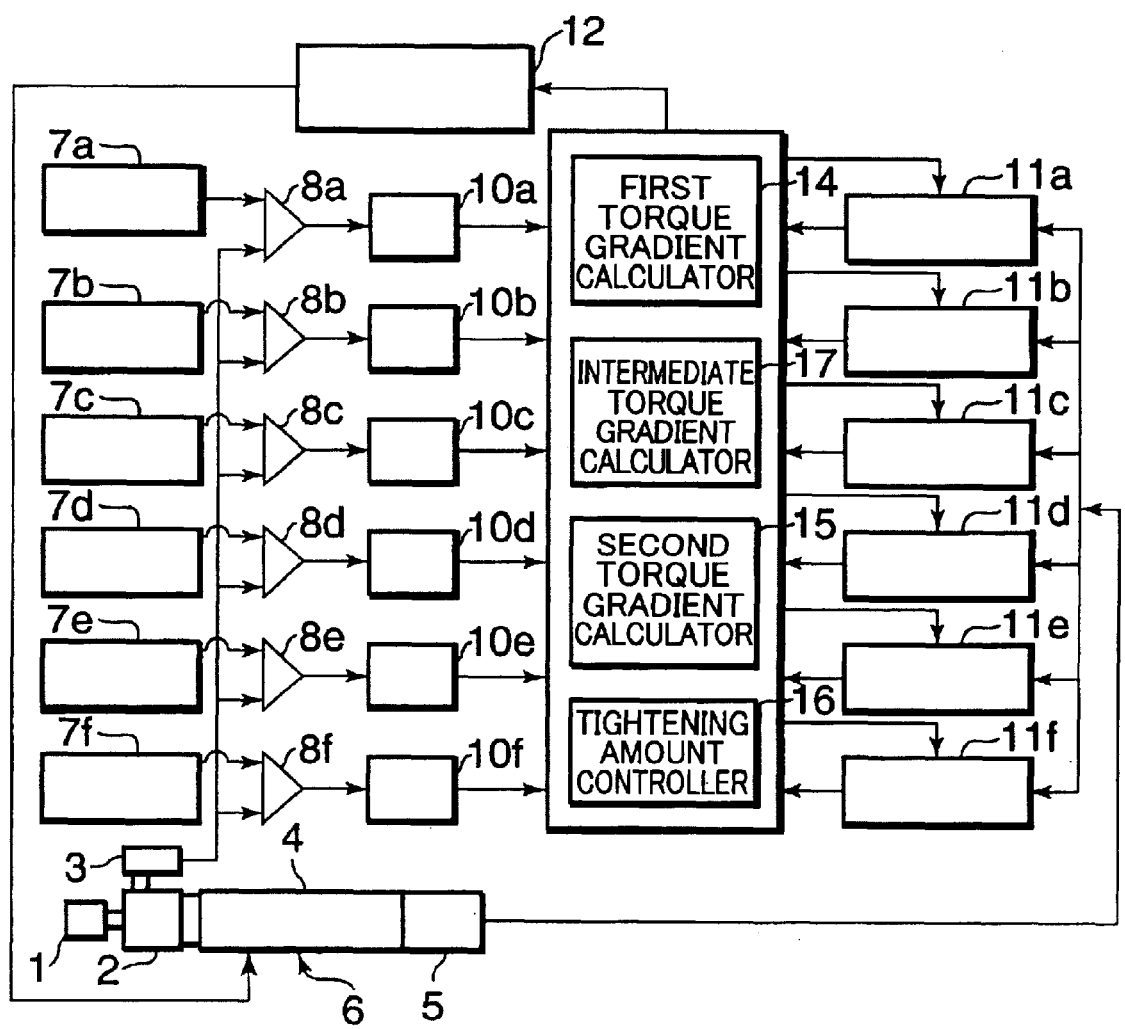
FIG. 8 is a block diagram of a bolt tightening apparatus according to a second embodiment of the invention.

FIG. 8 is a block diagram of a bolt tightening apparatus according to a second embodiment of the invention, in which elements identical or equivalent to those shown in FIG. 1 are designated by the same reference numerals. A CPU 9 of this bolt tightening apparatus includes a first torque gradient calculator 14, an intermediate torque gradient calculator 17, a second torque gradient calculator 15 and a tightening amount controller 16.

Figure 9:
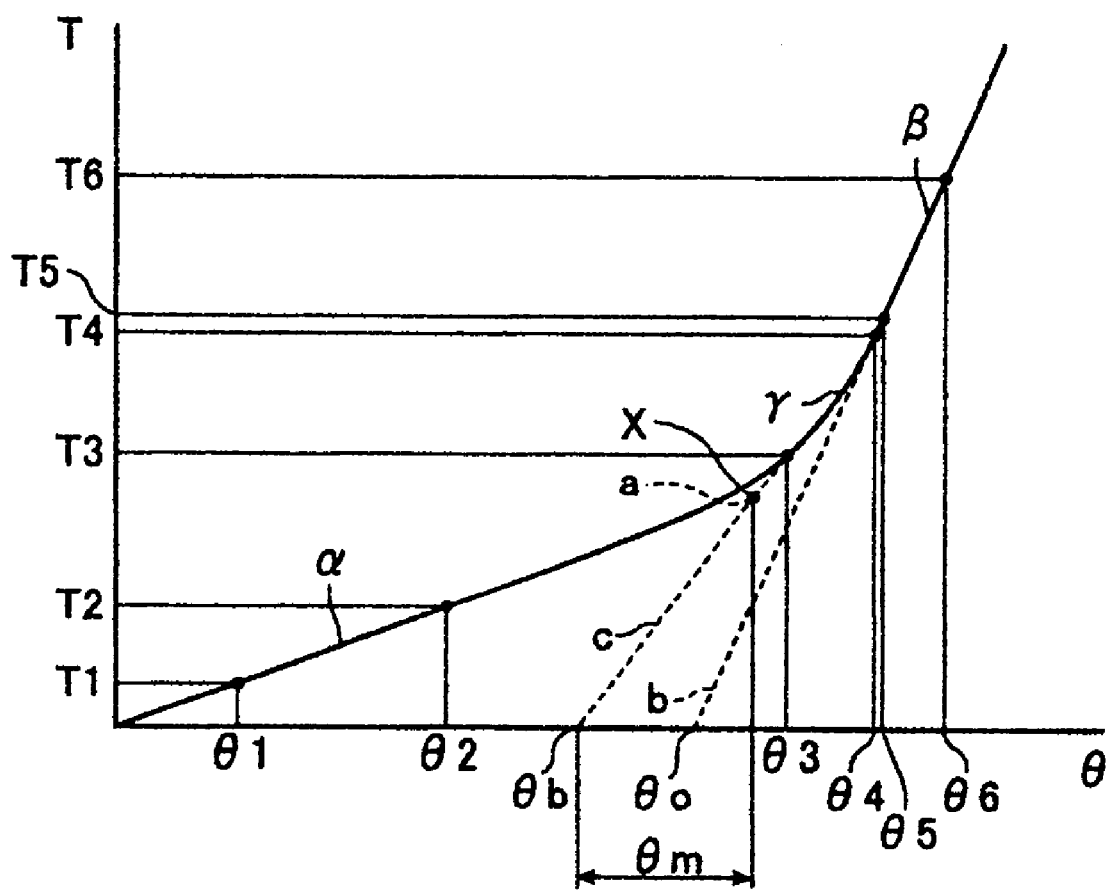
FIG. 9 is a graph showing how an inflection point between first and second torque gradients and the amount of additional bolt tightening are determined according to the second embodiment.

The first torque gradient calculator 14 calculates a first torque gradient α which is the ratio of a tightening torque T exerted on each bolt 25 in an initial bolt tightening stage by a bolt tightening device 6 to a tightening angle (bolt turning angle) θ in a case where the first torque gradient α differs from a second torque gradient β which is the ratio of the bolt tightening torque T exerted in a succeeding (final) bolt tightening stage as shown in FIG. 9.

The intermediate torque gradient calculator 17 calculates an intermediate torque gradient γ, which is the ratio of the bolt tightening torque T exerted during a process of transferring from a region of the first torque gradient α (initial bolt tightening stage) to a region of the second torque gradient β (final bolt tightening stage), to the bolt turning angle θ.

The second torque gradient calculator 15 calculates the second torque gradient β which is the ratio of the bolt tightening torque T exerted upon transferring to a higher torque region of the second torque gradient β to the bolt turning angle θ.

The tightening amount controller 16 determines coordinates of an inflection point X where lines of the first and second torque gradients α, β join based on the calculated values of the first torque gradient α and the intermediate torque gradient γ as well as the amount of additional tightening θm of the bolt 25 to be added to the amount of initial tightening based on the coordinates of the inflection point X and a line c having the intermediate torque gradient γ. Then, the tightening amount controller 16 determines coordinates of a theoretical seating point θo which is theoretically expected to be reached at the beginning of tightening the bolt 25 based on the second torque gradient β and controls the amount of bolt tightening based on the amount of initial tightening set by regarding the theoretical seating point θo as a starting point of tightening and the amount of additional tightening θm.

The bolt tightening apparatus further includes first to sixth tightening torque setters 7a–7f for setting first to sixth tightening torques T1–T6 within the elastic region of the bolt 25, first to sixth comparators 8a–8f for comparing the bolt tightening torque T detected by a tightening torque sensor 3 with the first to sixth tightening torque values T1–T6 set by the first to sixth tightening torque setters 7a–7f and outputting match signals for the individual tightening torques, first to sixth analog gates 10a–10f for outputting control signals corresponding to the match signals output from the individual comparators 8a–8d to the CPU 9, first to sixth angle gates 11a–11f for feeding control signals to the CPU 9 for causing an angle encoder 5 to measure the bolt turning angle at points in time when the aforementioned control signals are output from the first to sixth analog gates 10a–10f, and a servo amplifier 12 for controlling a drive motor 4 according to a control signal fed from the CPU 9.

Figure 10:
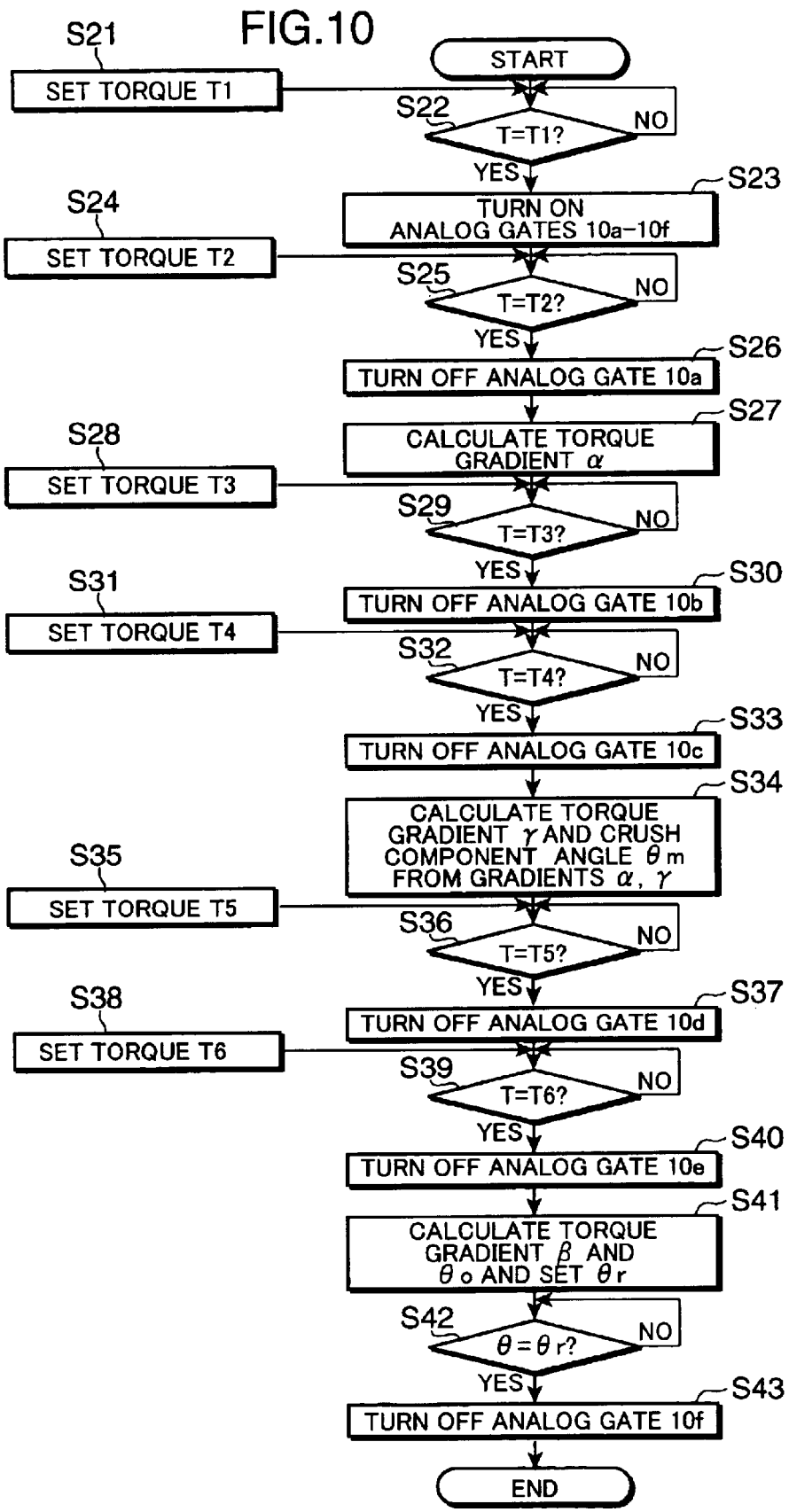
FIG. 10 is a flowchart showing how a bolt tightening method of is carried out by the bolt tightening apparatus of the second embodiment.

Described below referring to a flowchart of FIG. 10 is a sequence of a bolt tightening method carried out by the bolt tightening apparatus of the present embodiment when installing the bearing cap 21 to the mounting body 20 by fastening the bolts 25 with the half-shell bearing 23 fitted in the bearing bore 22. A process of tightening each bolt 25 commences as the drive motor 4 is caused to turn by a nut runner start signal fed from an external source to the servo amplifier 12. When the process begins, the first tightening torque setter 7a sets the first tightening torque value T1 (step S21). Next, the first comparator 8a compares the tightening torque T applied to the bolt 25 detected by the tightening torque sensor 3 with the first set value T1 and judges whether they coincide with each other (step S22).

At a point where the detected tightening torque T is judged to have matched the first set value T1 (Yes in S22), the first to sixth analog gates 10a–10f are set to an ON state (step S23). Then, coordinates (T1, θ1) reached at this point in time are determined and the second tightening torque setter 7b sets the second tightening torque value T2 (step S24). Next, the second comparator 8b compares the tightening torque T applied to the bolt 25 detected by the tightening torque sensor 3 with the second set value T2 and judges whether they coincide with each other (step S25).

At a point where the detected tightening torque T is judged to have matched the second set value T2 (Yes in S25), the first analog gate 10a is set to an OFF state (step S26). Then, coordinates (T2, θ2) reached at this point in time are determined, and the first torque gradient α is determined from the gradient of a line a passing the coordinates (T1, θ1) and (T2, θ2) (step S27).

Subsequently, the third tightening torque setter 7c sets the third tightening torque value T3 (step S28), and the third comparator 8c compares the tightening torque T applied to the bolt 25 detected by the tightening torque sensor 3 with the third set value T3 and judges whether they coincide with each other (step S29).

At a point where the detected tightening torque T is judged to have matched the third set value T3 (Yes in S29), the second analog gate 10b is set to an OFF state (step S30). Then, after coordinates (T3, θ3) reached at this point in time have been determined, the fourth tightening torque setter 7d sets the fourth tightening torque value T4 (step S31), and the fourth comparator 8d compares the tightening torque T applied to the bolt 25 detected by the tightening torque sensor 3 with the fourth tightening torque value T4 and judges whether they coincide with each other (step S32).

At a point where the detected tightening torque T is judged to have matched the fourth set value T4 (Yes in S32), the third analog gate 10c is set to an OFF state (step S33). Then, after coordinates (T4, θ4) reached at this point in time have been determined, the intermediate torque gradient γ is determined based on the coordinates (T3, θ3) and (T4, θ4) and the amount of additional tightening (crush component angle) θm is calculated using a function including the first torque gradient α as a coefficient and a function including the intermediate torque gradient γ as coefficient (step S34). Specifically, as illustrated in FIG. 9, the inflection point X joining the first and second torque gradients α, β is determined from the point of intersection of the line a passing the coordinates (T1, θ1) and (T2, θ2) and the line c passing the coordinates (T3, θ3) and (T4, θ4), and the amount of tightening (bolt turning angle) θm from a bolt tightening angle θb at the point of intersection of the line c passing the inflection point X and the x-axis to a bolt tightening angle at the point of intersection of the lines a and c is set as the crush component angle.

Subsequently, the fifth tightening torque setter 7e sets the fifth tightening torque value T5 (step S35), and the fifth comparator 8e compares the tightening torque T applied to the bolt 25 detected by the tightening torque sensor 3 with the fifth set value T5 and judges whether they coincide with each other (step S36).

At a point where the detected tightening torque T is judged to have matched the fifth set value T5 (Yes in S36), the fourth analog gate 10d is set to an OFF state (step S37). Then, after coordinates (T5, θ5) reached at this point in time have been determined, the sixth tightening torque setter 7f sets the sixth tightening torque value T6 (step S38), and the sixth comparator 8f compares the tightening torque T applied to the bolt 25 detected by the tightening torque sensor 3 with the sixth set value T6 and judges whether they coincide with each other (step S39).

At a point where the detected tightening torque T is judged to have matched the sixth set value T6 (Yes in S39), the fifth analog gate 10e is set to an OFF state (step S40), and coordinates (T6, θ6) reached at this point in time is determined. After the fifth analog gate 10e has been set to the OFF state, the second torque gradient calculator 15 calculates the second torque gradient β, the tightening amount controller 16 determines the theoretical seating point θo based on the second torque gradient β, and the amount of final tightening θr which is the sum of the amount of initial tightening θq and the amount of additional tightening θm exerted on the bolt 25 is set regarding the theoretical seating point θo as a starting point of tightening (step S41). Then, tightening of the bolt 25 is controlled based on the amount of final tightening θr thus obtained. Specifically, after setting the point of intersection of a line b passing the coordinates (T5, θ5) and (T6, θ6) and the x-axis as the theoretical seating point θo, a judgment is made to determine whether the turning angle θ of the bolt 25 measured from the theoretical seating point θo has reached a value corresponding to the amount of final tightening θr of the bolt 25 (step S42). When the turning angle θ is judged to have reached the value corresponding to the amount of final tightening θr (Yes in S42), the sixth analog gate 10f is set to an OFF state (step S43) and the aforementioned operation for controlling the tightening of the bolt 25 is finished.

The foregoing discussion of the present embodiment has dealt with a case where the first torque gradient α, which is the ratio of the bolt tightening torque T to the bolt turning angle θ in the initial tightening stage of tightening the bolt 25 using the bolt tightening device 6, differs from the second torque gradient β, which is the ratio of the bolt tightening torque T to the bolt turning angle θ in the succeeding (final) bolt tightening stage.

The bolt tightening method of the embodiment applicable to such a case includes the steps of calculating the first torque gradient α, which is the ratio of the bolt tightening torque T to the bolt turning angle θ in the initial tightening stage of tightening the bolt 25, calculating the intermediate torque gradient γ, which is the ratio of the bolt tightening torque T exerted on the bolt 25 during the process of transferring from the region of the first torque gradient α to the region of the second torque gradient β, to the bolt turning angle θ, determining the inflection point X joining the first and second torque gradients α, β based on the calculated values of the first torque gradient α and the intermediate torque gradient γ, determining the amount of additional tightening θm based on the inflection point X and the intermediate torque gradient γ, calculating the first torque gradient α, which is the ratio of the bolt tightening torque T to the bolt turning angle θ, in the region in which the bolt tightening torque T is larger than in the region of the intermediate torque gradient γ, determining the theoretical seating point θo which is theoretically expected to be reached at the beginning of tightening the bolt 25 based on the second torque gradient β, and then controlling the amount of bolt tightening based on the amount of initial tightening θq set by regarding the theoretical seating point θo as a starting point of tightening and the amount of additional tightening θm.

According to this bolt tightening method of the embodiment, it is possible to precisely determine the amount of additional tightening θm based on the inflection point X and the intermediate torque gradient γ and precisely determine the theoretical seating point θo based on the second torque gradient β. It is possible with this simple arrangement to effectively prevent such a problem that the tightening force is insufficient due to too small an amount of additional tightening θm or the bolt 25 is tightened by too large a force due to an excessively large amount of additional tightening θm exerted on the bolt 25 during the aforementioned operation for controlling tightening of the bolt 25.

Figure 11:
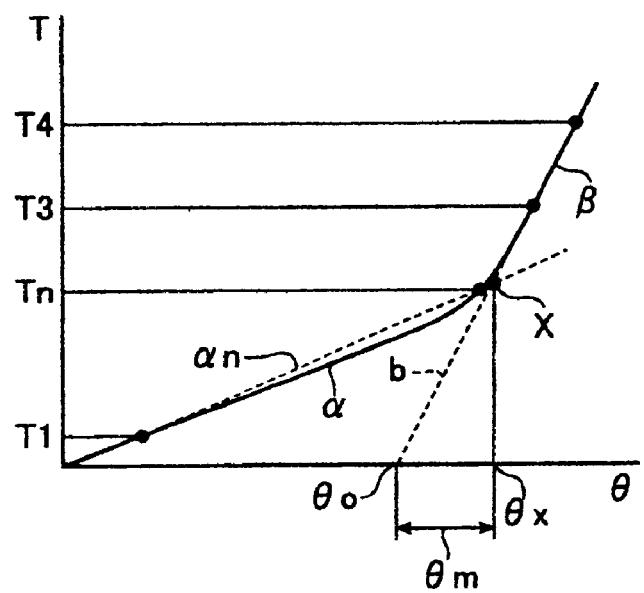
FIG. 11 is a graph showing how an inflection point between the first and second torque gradients and the amount of additional bolt tightening are determined in one variation of the second embodiment.

The bolt tightening method of the invention may be varied, as shown in FIG. 11, to sequentially sample values of a first torque gradient an between the first tightening torque value T1 preset in the initial bolt tightening stage and a currently detected tightening torque value Tn, set the point of intersection X of two lines of the aforementioned first and second torque gradients α, β based on the tightening torque value Tn detected at a point in time when the sampled value of the first torque gradient αn has matched a preset reference value, determine the theoretical seating point θo based on a line b passing coordinates (Tn, θx) of the point of intersection X and having a gradient corresponding to the second torque gradient β, and determine the amount of additional tightening θm corresponding to the aforementioned crush component angle θm. This variation may be arranged such that the sampled values of the first torque gradient an are calculated by the integral average gradient method using the aforementioned equation (1).

Figure 12:
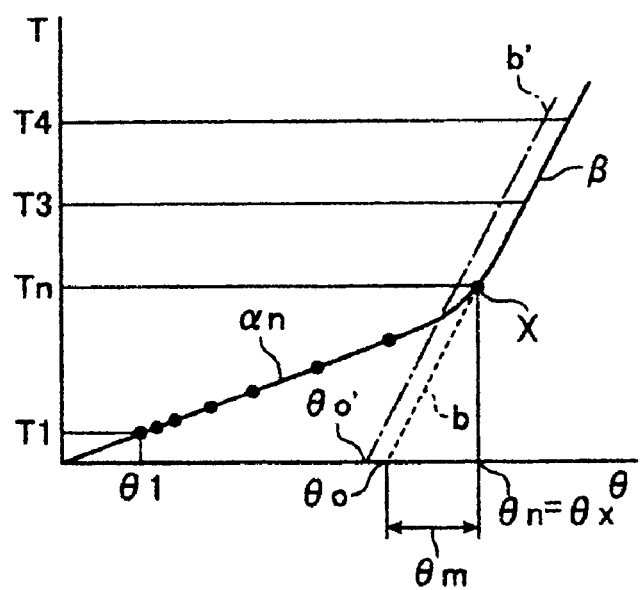
FIG. 12 is a graph showing how an inflection point between the first and second torque gradients and the amount of additional bolt tightening are determined in another variation of the second embodiment.

The bolt tightening method of the invention may also be varied, as shown in FIG. 12, to sequentially sample currently detected values Tn of the tightening torque T and currently detected values θn of the bolt turning angle θ from the point of the first tightening torque value T1 preset in the initial bolt tightening stage, determine the point of intersection X where a line connecting coordinates (Tn, θn) of the sampled values Tn, θn intersects the line of the second torque gradient β, determine the theoretical seating point θo based on a line b passing coordinates (Tn, θx) of the point of intersection X and having a gradient corresponding to the second torque gradient β, and determine the amount of additional tightening θm corresponding to the aforementioned crush component angle θm.

In the aforementioned variations shown in FIGS. 11 and 12, a value experimentally obtained beforehand may be used as the second torque gradient β instead of calculating the second torque gradient β each time.

With the bearing cap 21 and the mounting body 20 fastened by tightening the bolts 25, their curved inside surfaces are machined to produce the bearing bore 22. Then, the bearing cap 21 is once removed by undoing the bolts 25 and bolted again to the mounting body 20 with the two halves of the half-shell bearing 23 having the crush height CH fitted in the bearing bore 22. According to the foregoing embodiments, the amount of initial tightening θq of the bolt 25 is set based on the amount of tightening (bolt turning angle) applied to each bolt 25 when machining the bearing bore 22. Thus, the amount of final tightening θr of the bolt 25 is set to a value obtained by adding the aforementioned amount of additional tightening θm to the amount of initial tightening θq. This arrangement is advantageous in that the bearing cap 21 and the half-shell bearing 23 can be together fastened to the mounting body 20 under the same conditions as in the aforementioned process of machining the bearing bore 22.

In the foregoing embodiments, the theoretical seating point θo is determined based on the line b passing the inflection point X between the first and second torque gradients α, β used for setting the amount of initial tightening θq of the bolt 25. As an alternative, a theoretical seating point θo' may be obtained based on a line b' passing a point offset from the aforementioned point of intersection X by a specific distance as shown by a dot-and-dash line in FIG. 12. Furthermore, an amount of additional tightening θm' may be obtained by multiplying the crush component angle θm by a specific coefficient k.

Figure 13:
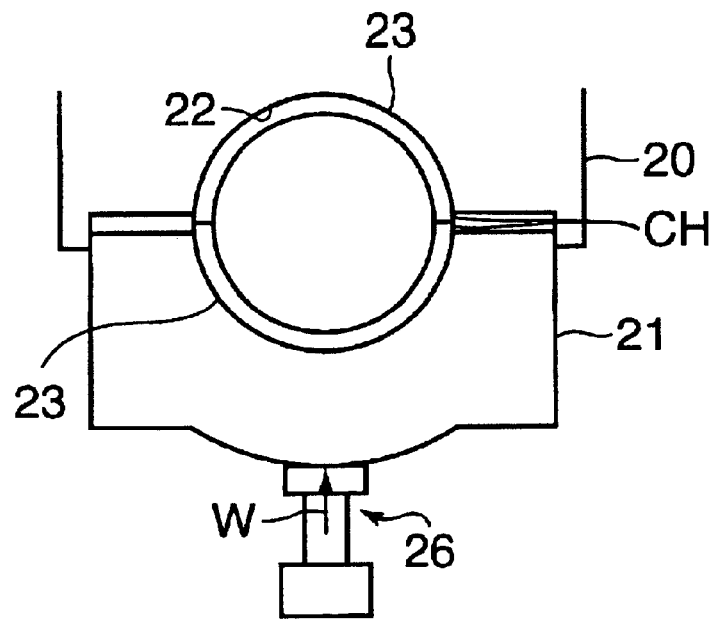
FIG. 13 is a diagram showing an alternative method of installing a bearing cap by means of a load cell.
Figure 14:
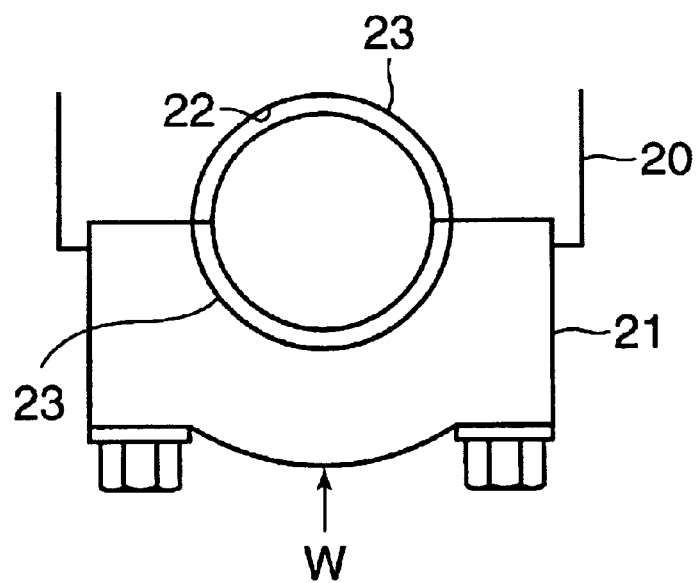
FIG. 14 is a diagram showing a state in which the bearing cap has been installed by the method of FIG. 13.

As stated above, the curved inside surfaces of the bearing cap 21 and the mounting body 20 are machined to produce the bearing bore 22 with the bearing cap 21 and the mounting body 20 fastened by tightening the bolts 25. Then, the bearing cap 21 is once removed by undoing the bolts 25 and bolted again to the mounting body 20 with the two halves of the half-shell bearing 23 having the crush height CH fitted in the bearing bore 22. In one alternative, the crush of the half-shell bearing 23 may be collapsed before bolting the bearing cap 21 to the mounting body 20 by exerting a specific pushing force W on the bearing cap 21 by means of a load cell 26 as shown in FIG. 13. In this alternative, the bearing cap 21 is fastened to the mounting body 20 by tightening the bolts 25 while exerting the pushing force W of a specific amount on the bearing cap 21 as shown in FIG. 14.

Figure 15:
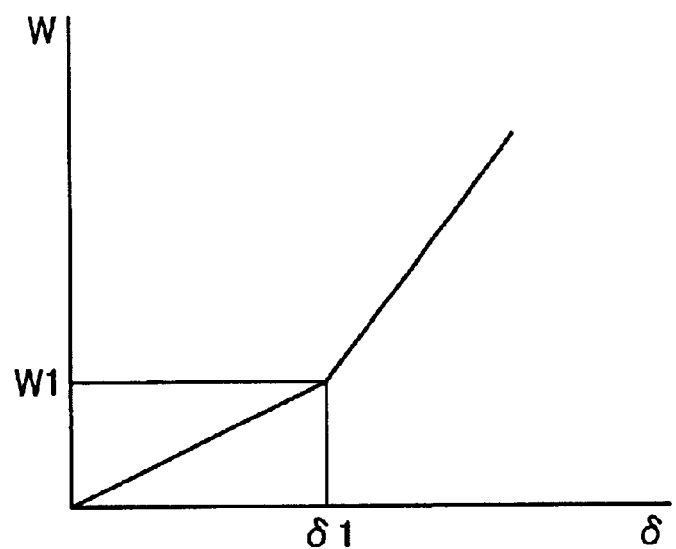
FIG. 15 is a graph showing the relationship between the amount of displacement of the bearing cap and a pushing force exerted by the load cell.

The pushing force W exerted by the load cell 26 and the amount of displacement δ of the bearing cap 21 has a relationship shown in FIG. 15. As can be seen from FIG. 15, the amount of displacement δ of the bearing cap 21 varies to a great degree with a relatively small amount of the pushing force W until the bearing crush is completely eliminated. After the bearing crush has been fully eliminated at a point of coordinates (W1, δ1), the amount of displacement δ of the bearing cap 21 varies at a smaller rate with an increase in the amount of the pushing force W. Thus, in this alternative, the rate of change in the pushing force W with respect to the amount of displacement δ of the bearing cap 21 is sequentially measured and, when the rate of change in the pushing force W has suddenly changed at the point of coordinates (W1, δ1), the rate of change is zeroed so that the pushing force W exerted by the load cell 26 will not increase any more from the point of sudden change. From this point onward, the bearing cap 21 is fastened to the mounting body 20 by tightening the bolts 25 while keeping the amount of the pushing force W1 unchanged. This arrangement makes it possible to properly perform the bolt tightening operation with ease while preventing variations in the tightening torque T which might occur due to the presence of the crush height CH.

Figure 16:
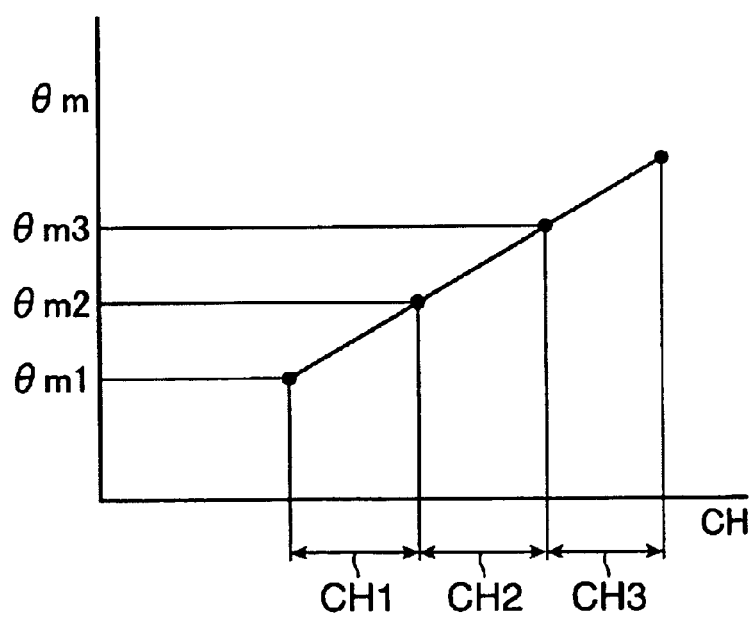
FIG. 16 is a graph showing the relationship between the amount of additional bolt tightening and crush height.
Figure 17:
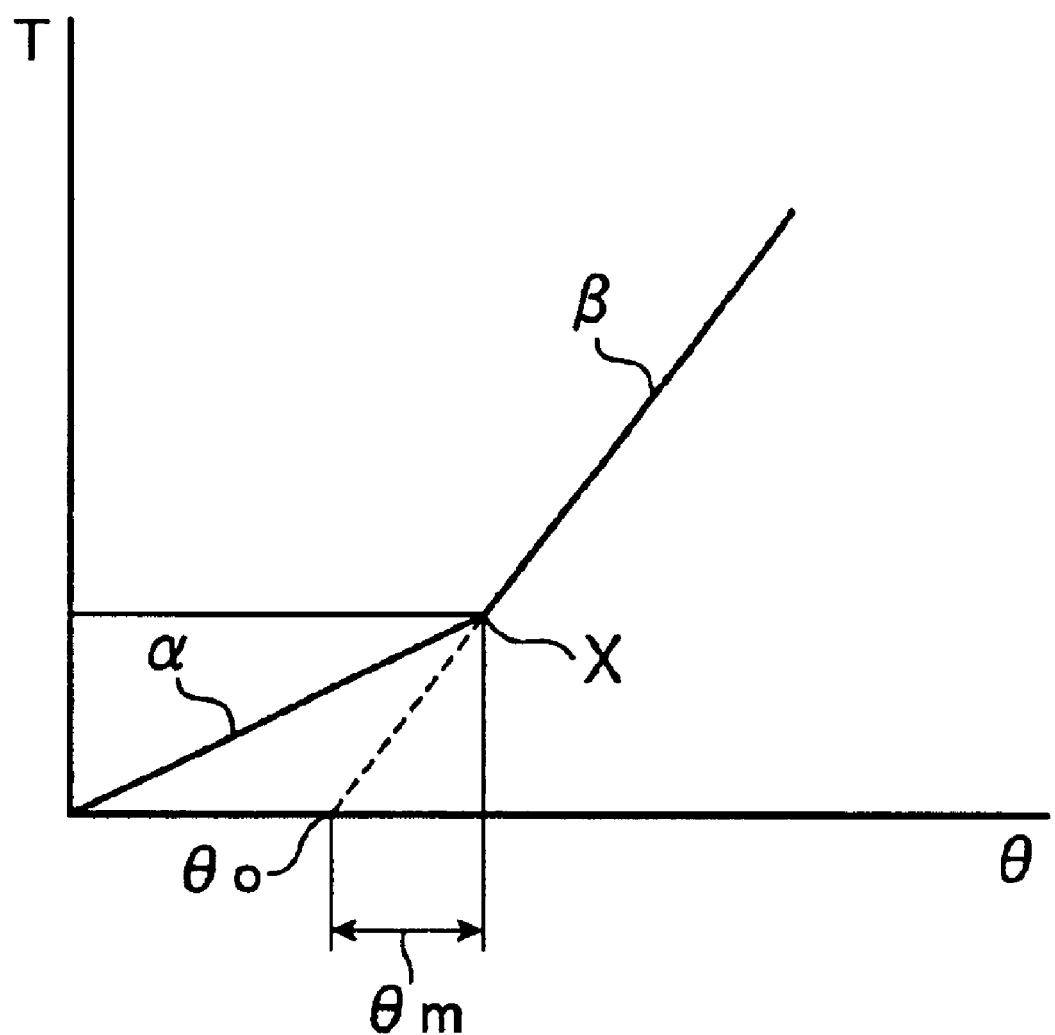
FIG. 17 is a graph showing a relationship between bolt tightening torque and bolt turning angle according to a conventional bearing cap installation method.

The bolt tightening method of the invention may also be varied in such a manner that half-shell bearings 23 are classified into multiple types beforehand according to the amount of their crush height CH (e.g., CH1, CH2 and CH3 as shown in FIG. 16) and the amount of additional tightening θm (θm1, θm2, θm3) corresponding to the crush height CH (CH1, CH2, CH3) of the half-shell bearing 23 in use is read out from a map and set, for example. This approach makes it possible to properly perform the bolt tightening operation with ease while preventing variations in the tightening torque T which might occur due to differences in the crush height CH.

While the bolt tightening methods and apparatus of the invention for fastening the bearing cap 21 to the mounting body 20 by the tightening bolts 25 have been described by way of example with reference to the specific embodiments and the variations and alternatives thereof, the invention is not limited to these embodiments, variations or alternatives but is applicable to any case where the torque gradient, which is the ratio of the bolt tightening torque applied by a bolt tightening device to the bolt turning angle, observed in an initial bolt tightening stage differs from the torque gradient observed in a succeeding (final) bolt tightening stage, such as when a bolt is fastened by use of a washer-based nut or a spring washer, for example.

In addition, although the foregoing embodiments employ an angle-based control method in which the amount of tightening of each bolt 25 is controlled based on its turning angle θ, the invention is not limited to this control method. For example, the invention is applicable to a more widely used method of controlling the amount of bolt tightening such as a torque-and-angle-based control method in which the amount of tightening is controlled based on the tightening torque T exerted on each bolt 25 and its turning angle θ.

Additional Features and Advantages

In one feature of the invention, there is provided a bolt tightening method used when tightening a bolt by using a bolt tightening device. The bolt tightening method includes the steps of calculating a torque gradient expressed in terms of the ratio of a tightening torque exerted on the bolt to its turning angle by detecting the tightening torque at intervals of a specific bolt turning angle, averaging calculated values of the torque gradient, and controlling the amount of tightening of the bolt based on an average of the individual torque gradient values calculated.

According to this bolt tightening method, the amount of bolt tightening can be properly controlled without being adversely influenced by changes in the torque gradient even when the torque gradient varies in a nonlinear fashion with changes in the bolt turning angle.

In summary, according to an important aspect of the invention, there are provided a bolt tightening method and a bolt tightening apparatus for tightening a bolt by using a bolt tightening device, in which a torque gradient expressed in terms of the ratio of a tightening torque exerted on the bolt to its turning angle is calculated by successively detecting the tightening torque at intervals of a specific bolt turning angle and calculating an average of individual torque gradient values, and the amount of tightening of the bolt is controlled based on the average of the individual torque gradient values calculated.

According to this aspect of the invention, it is possible to properly control the amount of bolt tightening even when the torque gradient varies in a nonlinear fashion with changes in the bolt turning angle.

In one form of the invention, this bolt tightening method is applied to a case where a bearing bore is formed between a bearing cap and a mounting body by machining their curved inside surfaces and the bearing cap is fastened to the mounting body by tightening the bolt with two halves of a half-shell bearing having a crush height fitted in the bearing bore. In this case, the aforementioned step of averaging is accomplished by determining at least one of first and second torque gradients by averaging the calculated values of the torque gradient, the first torque gradient being the ratio of the bolt tightening torque to the bolt turning angle calculated in a stage of eliminating bearing crush by tightening the bolt and the second torque gradient being the ratio of the bolt tightening torque to the bolt turning angle calculated in a succeeding stage of fastening the half-shell bearing and the bearing cap by tightening the bolt. Also, the aforementioned step of controlling is accomplished by determining a theoretical seating point of the bolt based on the calculated value of the second torque gradient, determining an inflection point joining the first and second torque gradients based on their calculated values, determining the amount of additional tightening of the bolt based on the inflection point and the second torque gradient, and controlling the amount of tightening of the bolt based on the amount of initial tightening set by regarding the theoretical seating point as a starting point of tightening and the amount of additional tightening.

In this bolt tightening method, it is possible to precisely determine the theoretical seating point of the bolt based on the calculated value of the second torque gradient even when the first torque gradient calculated in the stage of eliminating bearing crush by tightening the bolt and the second torque gradient calculated in the stage of fastening the half-shell bearing and the bearing cap by tightening the bolt vary in a nonlinear fashion, or the torque gradient gradually varies in the proximity of the inflection point joining the first and second torque gradients. Also, it is possible to precisely determine the inflection point between the first and second torque gradients based on their calculated values, and calculate the amount of additional tightening of the bolt based on the inflection point and the second torque gradient. As a result, the amount of tightening of the bolt can be properly controlled based on the amount of initial tightening set by regarding the theoretical seating point as a starting point of tightening and the amount of additional tightening when installing the half-shell bearing and the bearing cap.

In another feature of the invention, there is provided a bolt tightening method used when tightening a bolt by using a bolt tightening device in such a case that a first torque gradient which is the ratio of a bolt tightening torque to a bolt turning angle in an initial bolt tightening stage differs from a second torque gradient which is the ratio of the bolt tightening torque to the bolt turning angle in a succeeding final bolt tightening stage. This bolt tightening method includes the steps of calculating the first torque gradient in the initial bolt tightening stage, calculating an intermediate torque gradient which is the ratio of the bolt tightening torque to the bolt turning angle in a stage of transfer from a region of the first torque gradient to a region of the second torque gradient, determining an inflection point joining the first and second torque gradients based on the calculated values of the first torque gradient and the intermediate torque gradient, determining the amount of additional tightening of the bolt based on the inflection point and the intermediate torque gradient, calculating the second torque gradient upon transferring to the region of the second torque gradient, determining a theoretical seating point of the bolt based on the calculated value of the second torque gradient, and controlling the amount of tightening of the bolt based on the amount of initial tightening set by regarding the theoretical seating point as a starting point of tightening and the amount of additional tightening.

According to this bolt tightening method, even when the torque gradient gradually varies in the proximity of the inflection point joining the first torque gradient and the second torque gradient, it is possible to precisely determine the theoretical seating point of the bolt based on the calculated value of the second torque gradient, precisely determine the inflection point based on the calculated values of the first torque gradient and the intermediate torque gradient, and determine the amount of additional tightening of the bolt based on the inflection point and the intermediate torque gradient. Then, the amount of tightening of the bolt can be properly controlled based on the amount of initial tightening set by regarding the theoretical seating point as a starting point of tightening and the amount of additional tightening.

In one form of the invention, this bolt tightening method is applied to a case where a bearing bore is formed between a bearing cap and a mounting body by machining their curved inside surfaces and the bearing cap is fastened to the mounting body by tightening the bolt with two halves of a half-shell bearing having a crush height fitted in the bearing bore. In this case, the first torque gradient is calculated in a stage of eliminating bearing crush by tightening the bolt, the intermediate torque gradient is calculated in a stage of transfer to a succeeding region of fastening the half-shell bearing and the bearing cap by tightening the bolt, and the second torque gradient is calculated upon transferring to the region of fastening the half-shell bearing and the bearing cap.

According to this bolt tightening method, even when the torque gradient gradually varies in the proximity of the inflection point joining the first torque gradient calculated in the stage of eliminating bearing crush by tightening the bolt and the second torque gradient calculated in the succeeding stage of fastening the half-shell bearing and the bearing cap by tightening the bolt, it is possible to precisely determine the theoretical seating point of the bolt based on the calculated value of the second torque gradient, precisely determine the inflection point based on the calculated values of the first torque gradient and the intermediate torque gradient, and determine the amount of additional tightening of the bolt based on the inflection point and the intermediate torque gradient. Consequently, the amount of tightening of the bolt can be properly controlled based on the amount of initial tightening set by regarding the theoretical seating point as a starting point of tightening and the amount of additional tightening when installing the half-shell bearing and the bearing cap.

The aforementioned bolt tightening methods of the invention may be used in such a case where the bearing bore is formed by machining the curved inside surfaces of the bearing cap and the mounting body which are previously fastened together by tightening the bolt, and the bearing cap is once removed by undoing the bolt and bolted again to the mounting body with the two halves of the half-shell bearing fitted in the bearing bore, wherein the amount of initial tightening is set based on the amount of tightening of the bolt exerted in the process of machining the bearing bore.

In this form of the invention, the amount of final tightening to be applied when bolting the bearing cap to the mounting body with the half-shell bearing fitted in the bearing bore is obtained by adding the amount of additional tightening to the amount of initial tightening, so that the half-shell bearing and the bearing cap can be fastening with the same tightening force as exerted when machining the bearing bore.

In one feature of the invention, a bolt tightening apparatus for tightening a bolt by using a bolt tightening device includes a mean torque gradient calculator for calculating a torque gradient expressed in terms of the ratio of a tightening torque exerted on the bolt to its turning angle by successively detecting the tightening torque at intervals of a specific bolt turning angle and calculating an average of individual torque gradient values, and a tightening amount controller for controlling the amount of tightening of the bolt based on the average of the torque gradient values.

With the bolt tightening apparatus thus constructed, the amount of bolt tightening can be properly controlled without being adversely influenced by changes in the torque gradient even when the torque gradient varies in a nonlinear fashion with changes in the bolt turning angle.

In one form of the invention, the bolt tightening apparatus is used in a case where a bearing bore is formed between a bearing cap and a mounting body by machining their curved inside surfaces and the bearing cap is fastened to the mounting body by tightening the bolt with two halves of a half-shell bearing having a crush height fitted in the bearing bore. This bolt tightening apparatus further includes a first torque gradient calculator for calculating a first torque gradient which is the ratio of the bolt tightening torque to the bolt turning angle calculated in a stage of eliminating bearing crush by tightening the bolt, a second torque gradient calculator for calculating a second torque gradient which is the ratio of the bolt tightening torque to the bolt turning angle calculated in a succeeding stage of fastening the half-shell bearing and the bearing cap by tightening the bolt, and a tightening amount controller for controlling the amount of tightening of the bolt. In this bolt tightening apparatus, the mean torque gradient calculator constitutes at least one of the first and second torque gradient calculators, and the tightening amount controller determines a theoretical seating point of the bolt based on the calculated value of the second torque gradient, determines an inflection point joining the first and second torque gradients based on their calculated values, determines the amount of additional tightening of the bolt based on the inflection point and the second torque gradient, and controls the amount of tightening of the bolt based on the amount of initial tightening set by regarding the theoretical seating point as a starting point of tightening and the amount of additional tightening.

With the bolt tightening apparatus thus constructed, it is possible to precisely determine the theoretical seating point of the bolt based on the calculated value of the second torque gradient even when the first torque gradient calculated in the stage of eliminating bearing crush by tightening the bolt and the second torque gradient calculated in the stage of fastening the half-shell bearing and the bearing cap by tightening the bolt vary in a nonlinear fashion, or the torque gradient gradually varies in the proximity of the inflection point joining the first and second torque gradients. Also, it is possible to precisely determine the inflection point between the first and second torque gradients based on their calculated values, and calculate the amount of additional tightening of the bolt based on the inflection point and the second torque gradient. As a result, the amount of tightening of the bolt can be properly controlled based on the amount of initial tightening set by regarding the theoretical seating point as a starting point of tightening and the amount of additional tightening when installing the half-shell bearing and the bearing cap.

In another feature of the invention, there is provided a bolt tightening apparatus for tightening a bolt by using a bolt tightening device in such a case that a first torque gradient which is the ratio of a bolt tightening torque to a bolt turning angle in an initial bolt tightening stage differs from a second torque gradient which is the ratio of the bolt tightening torque to the bolt turning angle in a succeeding final bolt tightening stage. This apparatus includes a first torque gradient calculator for calculating the first torque gradient in the initial bolt tightening stage, an intermediate torque gradient calculator for calculating an intermediate torque gradient which is the ratio of the bolt tightening torque to the bolt turning angle in a stage of transfer from a region of the first torque gradient to a region of the second torque gradient, a second torque gradient calculator for calculating the second torque gradient upon transferring to the region of the second torque gradient, and a tightening amount controller for controlling the amount of tightening of the bolt. In this bolt tightening apparatus, the tightening amount controller determines an inflection point joining the first torque gradient and the intermediate torque gradient based on their calculated values, determines the amount of additional tightening of the bolt based on the inflection point and the intermediate torque gradient, determines a theoretical seating point of the bolt based on the calculated value of the second torque gradient, and controls the amount of tightening of the bolt based on the amount of initial tightening set by regarding the theoretical seating point as a starting point of tightening and the amount of additional tightening.

According to the bolt tightening apparatus thus constructed, even when the torque gradient gradually varies in the proximity of the inflection point joining the first torque gradient and the second torque gradient, it is possible to precisely determine the theoretical seating point of the bolt based on the calculated value of the second torque gradient, precisely determine the inflection point based on the calculated values of the first torque gradient and the intermediate torque gradient, and determine the amount of additional tightening of the bolt based on the inflection point and the intermediate torque gradient. Then, the amount of tightening of the bolt can be properly controlled based on the amount of initial tightening set by regarding the theoretical seating point as a starting point of tightening and the amount of additional tightening.

The aforementioned bolt tightening apparatus of the invention may be used in such a case where a bearing bore is formed by machining curved inside surfaces of a bearing cap and a mounting body which are previously fastened together by tightening the bolt, and the bearing cap is once removed by undoing the bolt and bolted again to the mounting body with two halves of a half-shell bearing fitted in the bearing bore. In this bolt tightening apparatus, the first torque gradient calculator calculates the first torque gradient in a stage of eliminating bearing crush by tightening the bolt, the intermediate torque gradient calculator calculates the intermediate torque gradient in a stage of transfer to a succeeding region of fastening the half-shell bearing and the bearing cap by tightening the bolt, and the second torque gradient calculator calculates the second torque gradient upon transferring to the region of fastening the half-shell bearing and the bearing cap.

According to the bolt tightening apparatus thus constructed, even when the torque gradient gradually varies in the proximity of the inflection point joining the first torque gradient calculated in the stage of eliminating bearing crush by tightening the bolt and the second torque gradient calculated in the succeeding stage of fastening the half-shell bearing and the bearing cap by tightening the bolt, it is possible to precisely determine the theoretical seating point of the bolt based on the calculated value of the second torque gradient, precisely determine the inflection point based on the calculated values of the first torque gradient and the intermediate torque gradient, and determine the amount of additional tightening of the bolt based on the inflection point and the intermediate torque gradient. Consequently, the amount of tightening of the bolt can be properly controlled based on the amount of initial tightening set by regarding the theoretical seating point as a starting point of tightening and the amount of additional tightening when installing the half-shell bearing and the bearing cap.

This application is based on Japanese patent application No. 2002-234044, filed in Japan Patent Office on Aug. 9, 2002, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A bolt tightening method applied when tightening a bolt by using a bolt tightening device in such a case that a first torque gradient which is a ratio of a bolt tightening torque to a bolt turning angle in an initial bolt tightening stage differs from a second torque gradient which is the ratio of the bolt tightening torque to the bolt turning angle in a succeeding final bolt tightening stage, said method comprising the steps of:

calculating the first torque gradient in the initial bolt tightening stage;

calculating an intermediate torque gradient which is the ratio of the bolt tightening torque to the bolt turning angle in a stage of transfer from a region of the first torque gradient to a region of the second torque gradient;

determining an inflection point joining the first and second torque gradients based on the calculated values of the first torque gradient and the intermediate torque gradient;

determining an amount of additional tightening of the bolt based on the inflection point and the intermediate torque gradient;

calculating the second torque gradient upon transferring to the region of the second torque gradient;

determining a theoretical seating point of the bolt based on the calculated value of the second torque gradient; and controlling an amount of tightening of the bolt based on an amount of initial tightening set by regarding the theoretical seating point as a starting point of tightening and the amount of additional tightening.

2. The bolt tightening method according to claim 1, applicable to a case where a bearing bore is formed between a bearing cap and a mounting body by machining their curved inside surfaces and the bearing cap is fastened to the mounting body by tightening the bolt with two halves of a half-shell bearing having a crush height fitted in the bearing bore;

wherein the first torque gradient is calculated in a stage of eliminating bearing crush by tightening the bolt, the intermediate torque gradient is calculated in a stage of transfer to a succeeding region of fastening the half-shell bearing and the bearing cap by tightening the bolt, and the second torque gradient is calculated upon transferring to the region of fastening the half-shell bearing and the bearing cap.

3. The bolt tightening method according to claim 2, applicable to a case where the bearing bore is formed by machining curved inside surfaces of the bearing cap and the mounting body which are previously fastened together by tightening the bolt, and the bearing cap is once removed by undoing the bolt and bolted again to the mounting body with the two halves of the half-shell bearing fitted in the bearing bore, wherein the amount of initial tightening is set based on the amount of tightening of the bolt exerted in said process of machining the bearing bore.

4. A bolt tightening apparatus for tightening a bolt by using a bolt tightening device in such a case that a first torque gradient which is a ratio of a bolt tightening torque to a bolt turning angle in an initial bolt tightening stage differs from a second torque gradient which is the ratio of the bolt tightening torque to the bolt turning angle in a succeeding final bolt tightening stage, said apparatus comprising:

a first torque gradient calculator for calculating the first torque gradient in the initial bolt tightening stage;

an intermediate torque gradient calculator for calculating an intermediate torque gradient which is the ratio of the bolt tightening torque to the bolt turning angle in a stage of transfer from a region of the first torque gradient to a region of the second torque gradient;

a second torque gradient calculator for calculating the second torque gradient upon transferring to the region of the second torque gradient; and a tightening amount controller for controlling the amount of tightening of the bolt;

wherein said tightening amount controller determines an inflection point joining the first torque gradient and the intermediate torque gradient based on their calculated values, determines an amount of additional tightening of the bolt based on the inflection point and the intermediate torque gradient, determines a theoretical seating point of the bolt based on the calculated value of the second torque gradient, and controls the amount of tightening of the bolt based on an amount of initial tightening set by regarding the theoretical seating point as a starting point of tightening and the amount of additional tightening.

5. The bolt tightening apparatus according to claim 4 which is used in a case where a bearing bore is formed by machining curved inside surfaces of a bearing cap and a mounting body which are previously fastened together by tightening the bolt, and the bearing cap is once removed by undoing the bolt and bolted again to the mounting body with two halves of a half-shell bearing fitted in the bearing bore;

wherein said first torque gradient calculator calculates the first torque gradient in a stage of eliminating bearing crush by tightening the bolt, said intermediate torque gradient calculator calculates the intermediate torque gradient in a stage of transfer to a succeeding region of fastening the half-shell bearing and the bearing cap by tightening the bolt, and said second torque gradient calculator calculates the second torque gradient upon transferring to the region of fastening the half-shell bearing and the bearing cap.

* * * * *